G. B. ROBINSON.
Carriage-Spring.
No. 961
Patented Oct. 3, 1838
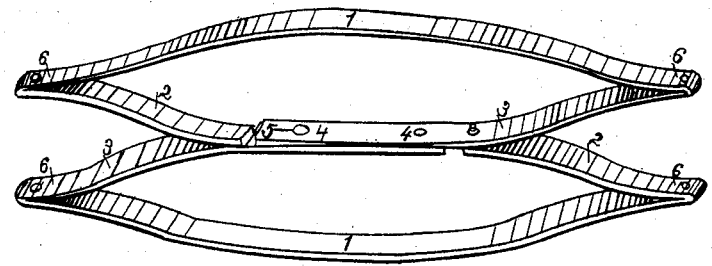

UNITED STATES PATENT OFFICE.

GEORGE B. ROBINSON, OF PAWLET, VERMONT.

MODE OF CONSTRUCTING ELLIPTICAL SPRINGS FOR CARRIAGES, &c.

Specification of Letters Patent No. 961, dated October 3, 1838.

*To all whom it may concern:*

Be it known that I, GEORGE B. ROBINSON, of Pawlet, in the county of Rutland and State of Vermont, have invented a new and useful Improvement in Carriage Springs; and I do hereby declare that the following is a full and exact description.

The nature of my invention consists in providing my spring with sliding bars in its center, which when the spring is depressed will permit the center springs to slide apart and lengthen, so as to balance itself in all positions.

To enable others skilled in the art to make and use my invention I will proceed to describe its construction and operation.

I construct my spring about four feet long and compose the same of single bars of steel. I form the base section of my spring in an elliptical form as shown at 1 in the accompanying drawing; which I set into or upon a concave bolster in the usual manner. Upon the right section of this spring, I place a similar spring, as shown at 2, of about fifteen inches in length, and confine their ends at 6. by welding and nuts and screws. I place these springs in a conical form as shown at 1 2. I also place, a similar spring, upon the left section of the base spring 1 as shown at 3, which is about two feet and nine inches in length, and extending nearly to the spring 2, and confine their ends at 6 as herein before described. I form the spring 3, in a straight line to the extent of one and one half feet on the left of the conical form of the same. I construct one other conical or elliptical spring in the same manner as herein before described, and place the same above and upon the springs hereinfirst described with its short arm (or spring 2.) upon the left hand and confine the same at 6 6 by bolts and screws. I make a groove or mortise through the upper spring 3, as shown, on the same, at 5, of about one inch in length. I insert a rivet through the same, and confine the rivet to the lower spring 3, as shown at 4. I make one other mortise or opening opposite to the one first mentioned, through the lower spring 3, nor its end, and insert another rivet (with a broad head) through the mortise, and confine the same to the upper spring 3, as shown at 4.

The operation of my spring is as follows: When the spring is depressed by weight, the center springs 3. 3. slide apart, and by means of the grooves and pins aforesaid, this section of the spring is lengthened, which motion in its effect, springs the ends of the spring apart at 6. Connecting the center springs 3. 3. so as to slide upon each other, as above described, tends to strengthen the spring and to preserve its balance of motion.

What I claim as my invention, and desire to secure by Letters Patent, is—

The center springs 3. 3, and the sliding grooves 5, being constructed and operating substantially as herein described, in combination with the spring 1. 2. 3. above described.

GEO. B. ROBINSON.

Witnesses:
FRANKLIN WALLACE,
THOS. C. ROBINSON.